United States Patent [19]

Joseph et al.

[11] Patent Number: 4,788,075

[45] Date of Patent: Nov. 29, 1988

[54] METHOD FOR PRODUCING ASEPTICALLY-PACKAGED PUDDINGS

[75] Inventors: Theodore H. Joseph, Cranbury; Douglas M. Lehmann, Howell; Joyce P. St. John, Crosswicks; Natale Butera, Englishtown, all of N.J.

[73] Assignee: General Foods Corporation, White Plains, N.Y.

[21] Appl. No.: 68,685

[22] Filed: Jul. 1, 1987

Related U.S. Application Data

[63] Continuation of Ser. No. 914,204, Oct. 1, 1986.

[51] Int. Cl.$^4$ ................................................ A23L 1/04
[52] U.S. Cl. .................................... 426/579; 426/399; 426/413
[58] Field of Search ................................ 426/578, 579

[56] References Cited

U.S. PATENT DOCUMENTS 3,170,461 11/1973 Stewart, Jr. et al. ............... 426/380
4,609,554 9/1986 Barua et al. ......................... 426/43
4,623,552 11/1986 Rapp ................................... 426/575

OTHER PUBLICATIONS

Egermeier et al., "Aseptically Processed Puddings Last 9+ Months in Refrigerated Storage", *Food Processing*, Sep. '82, pp. 92–94.

*Primary Examiner*—Jeanette Hunter
*Attorney, Agent, or Firm*—Thomas R. Savoie; Daniel J. Donovan

[57] ABSTRACT

Utilizing a combination of a low starch level, a high lauric acid-containing fat and from 0.12 to 0.2% sodium-stearoyl-2-lactylate a pudding is formulated which has a low on-line viscosity after cooking and sterilization and when subject to refrigerator storage develops a desirably high viscosity and a preferred texture and mouthfeel as compared to high starch level puddings. The cooked and sterilized pudding formulation of this invention is cooled in non-swept-surface heat exchangers after the cooking and sterilization step.

9 Claims, No Drawings

METHOD FOR PRODUCING ASEPTICALLY-PACKAGED PUDDINGS

This is a continuation of application Ser. No. 914,204 filed 10/1/86.

BACKGROUND OF THE INVENTION

Consumers have in recent times been desirous of eating wholesome and nutritious snack foods. Milk-containing puddings have long been considered nutritious and wholesome foods. Consumers are, however, requiring that the foods they eat, particularly snack food and dessert items, be essentially ready-to-eat. The lifestyles of this era do lend themselves to the task of preparing foods significantly in advance of consumption. Thus the amounts of cooked puddings and even instant puddings prepared in the home environment has been decreasing in recent years.

To fill the need of consumers for pudding dessert or snack items which require no preparation on the part of the consumer, there exists ready-to-eat puddings which are usually marketed in single-service portions. Initially these products were marketed as shelf-stable canned products. These canned puddings which have been subjected to a retort step during processing do not process the texture and flavor which consumers associate with home-cooked pudding. More recently, single-service portions of refrigerated aseptically-packaged pudding products have entered the market; however, these puddings also have been judged to possess textural defects and/or inconsistencies.

We have found that the aseptically-packaged pudding products available from others contain a relatively high level of starch of about 4.5% or more by weight of the pudding. It is believed that this level of starch was felt necessary in order to produce a pudding which possessed a desirably high viscosity and was also free from syneresis during a refrigerated distribution and storage period which could extend to three months or more. Such puddings are characterized as having an undesirable pasty or starchy texture and mouthfeel and do not exhibit the clean, smooth, melt-in-the-mouth texture and mouthfeel that consumers obtain from fresh, homemade puddings. In addition, these high starch pudding formulations possess a high after-cook viscosity which requires the use of swept-surfaces heat exchangers in order to cool the pudding prior to packaging. Such a process is described in an article found in *Food Processing*, September 1982 at pages 92–94 and entitled, "Aseptically Processed Puddings Last 9+ Months In Refrigerated Storage." Swept-surface heat exchangers require a large capital investment and incur high operating and maintenance costs as compared to non-swept-surface heat exchangers, such as fixed plate or tube heat exchangers.

It would be desirable to be able to produce an aseptically-packaged, ready-to-eat pudding which was both free of syneresis and possessed the mouthfeel of home-cooked puddings. It would further be desirable to be able to commercially produce such a pudding utilizing one or more non-swept-surface heat exchangers in order to cool the pudding formulation after it has been subjected to a cooking/sterilization step and before the pudding formulation is aseptically-packaged.

SUMMARY OF THE INVENTION

Through a combination of formulation and processing specifications, it has been found that it is possible to prepare an aseptically-packaged pudding which has a relatively-low, on-line viscosity such that the cooked pudding can be cooled in a non-swept surface heat exchanger, which achieves a desirable product viscosity over time and which remains essentially free of syneresis during prolonged refrigerated storage.

According to the present invention the pudding formulation contains from 3.5 to 10% of a fat which has a lauric acid content of at least 20%, preferably at least 40%, from 2.5 to 4.2% of an essentially amylose-free, chemically-modified starch and from about 0.12 to 0.2% by weight of an anionic surfactant such as sodium-stearyol 2-lactylate. Further, according to this invention the formulation is processed so that the fat and surfactant are completely dispersed prior to the time the formulation is heated to the point where the starch is cooked. Dispersion of the fat and surfactant is effected by the use of an elevated temperature of between 125° and 160° F. (51.7° and 71.1° C.) for both mixing and homogenizing the pudding formulation. After homogenization, the formulation is subjected to a conventional "high-temperature, short-time (HTST) treatment which is sufficient both to render the formulation commercially sterile and to fully gelatinize the starch contained in the formulation.

The HTST heat treatment is conducted to achieve a temperature of at least 265° F. (129.4° C.). A swept-surface heat exchanger is used to effect this heating; however, contrary to standard practice, the sterilized formulation is passed from the HTST step directly to one or more non-swept-surface heat exchangers (e.g. fixed plate or tube heat exchangers). The formulation is cooled to a temperature below 130° F. (54.4° C.) and typically will be cooled down to a point just above tthe melting point of the fat component of the formulation in the non-swept surface heat exchangers. The formulation may be further cooled to a typical fill temperature of about 70° to 80° F. (21° to 27° C.). This final cooling may be conducted in either swept-surface or non-swept-surface heat exchangers, depending on the on-line viscosity of the particular formulation being processed and the particular fill temperature being employed.

The puddings produced in accordance with this invention build and maintain a desirable viscosity over their intended storage and distribution cycle of from one to three months or more. Additionally, the puddings possess excellent texture, mouthfeel and melt-down characteristics.

DETAILED DESCRIPTION OF THE INVENTION

It is conventional to prepare aseptically-packaged, ready-to-eat puddings by batching and homogenizing the ingredients and then to rapidly heat and cool the pudding formulation in a series of swept-surface (e.g. scraped-surface) heat exchangers. In order to minimize the adverse effects of prolonged heating, such as found in retort systems, a HTST heating step is employed with temperatures of from 265° to 305° F. (129.4° to 151.7° C.) and times of from 6 to 30 seconds being typical.

"Pudding" as used herein is meant to refer creamy-textured food product containing milk solids, fat and starch. Any percents given are percents by weight and in the case of puddings containing discrete particles or pieces, such as nuts or fruit, the weight percent is basis, the pudding phase only.

According to prior teachings, puddings have been thought to rely on the formation of a starch set in order to yield the soft, gel-like consistency desired in the pudding product. This has led to the use of chemically-modified food starches at a level in excess of about 5% for the preparation of refrigerated, aseptically-packaged puddings. Suitable starches are those esterified and etherified starches which are commercially-available and well-known to those skilled in the art and which are further described in the U.S. Code of Federal Regulations at 21 CFR 172.892.

For use in the pudding products of this invention these same chemically-modified starch are utilized at a level of only 2.5 to 4.2%, typically a level of about 2.5 to 3.3% and may readily be used at a level as low as from 2.5 to 3.0%. Further, the starch should be essentially amylose-free, such as a waxy maize starch, as the presence of amylose is seen to adversely effect the texture of the pudding product. According to this invention the level of starch must be sufficient to prevent the development of syneresis during the storage and refrigeration cycles to which a commercial product might be subjected. The starch level cannot, however, be so high that an undesirable high viscosity develops in the product either on-line (e.g., after HTST and before packing) or during storage, or that a pasty or gummy mouthfeel develops in the pudding product.

An important feature of this invention is that the viscosity of the pudding product is only partially dependent upon the formation of a starch viscosity controlling or setting system and that a second viscosity controlling system supplements the starch system. As a result of the presence of two viscosity controlling systems a reduced level of starch may be used in the pudding formulation. The second system is a temperature-reversible system is based on the interaction of high lauric acid-containing fats and an anionic surfactant, such as sodium-stearoyl-2-lactylate, calcium-stearoyl-2-lactylate, sodium lauryl sulfate, etc., which will occur in the ionic environment of ready-to-eat pudding formulations. The pudding formulations of this invention are essentially-free of hydrocolloid thickeners such as gelatin or gums.

The fat required for use in this invention are those which either alone or in combination possess a lauric acid content of at least 20% by weight, preferably at least 30% and most preferably at least 40%. Coconut oil and palm kernel oil are fats which have a lauric acid content above 40% by weight. Other commonly-used fats such as cottonseed oil, corn oil, soybean oil, and the like possess lauric acid contents of under 1% by weight. The fat suitable for use in this invention will have a relatively-high melting point of over 90° F. (32.2° C.), preferably over 100° F. (37.8° C.). All or a portion of the fat may be partially or fully hydrogenated.

The surfactant is used at a level of from about 0.12 to 0.2% by weight of the pudding. With starch levels in excess of about 3%, the level of surfactant will typically be 0.18% or less. Sodium-stearyl-2-lactylate, the preferred surfactant, is a known emulsifier for use in puddings and is approved for use in puddings at a level not to exceed 0.2% (21 CFR 172.846). This material which is commercially-available under the name Emplex, a product of Patco Co. of Kansas City, Kans. has a melting point of about 108° F. (42° C.).

In order to effect development of the anionic surfactant-fat viscosity controlling system, it is necessary to both batch and homogenize the pudding formulation at a temperature between 125° and 160° F. (51.7° and 71.1° C.). Processing at this elevated temperature will insure that the anionic surfactant is fully dispersed and that the fat will exist as relatively finely-sized droplets as compared to formulations which are homogenized at lower temperatures. Homogenization preferably takes place in two stages with the first stage typically operating at a pressure of at least 1000 psig and the second stage operating at a pressure of at least 400 psig.

After homogenization the pudding will be cooked and sterilized by means of a HTST heating step. This heating will be effected in a continuous manner making use of one or more swept-surface heat exchangers in order to quickly and uniformly raise the temperature of the pudding to between 265° and 305° F. (129.4° and 151.7° C.). The pudding formulation is maintained within this elevated temperature range for a period of from six to thirty seconds during which time the starch is fully cooked (i.e., gelatinized) and the formulation is rendered commercially sterile.

In commercial operation it may be necessary to provide an agitated hold tank for the pudding between the homogenization step and the HTST heating step. Hold-up of all or a portion of the pudding results from the fact that the homogenizer is usually fed from a batch mixing system but the HTST heat exchanger should be operated in a continuous manner. In order to avoid microbial problems the pudding should be maintained at a temperature of 70° F. (21.1° C.) or below during any hold-up period. Cooling of the pudding after homogenization as well as preliminary heating of the cooled pudding up to a temperature of about 185° F. (85° C.) can readily be effected by the use of non-swept-surface heat exchangers. This manner of cooling and heating is possible due to the fact that the starch is uncooked and contributes very little to the viscosity of the pudding at this point of processing. The viscosity of the pudding formulation prior to the HTST heating step is relatively low due to the absence of starch and the fact that the formulation is kept in constant motion.

An innovative feature of the present invention is the fact that, due to the relatively low starch level and concomitant low viscosity of the cooked pudding formulation, non-swept-surface heat exchangers may be utilized immediately after or down-stream of the HTST heating step for cooling the cooked and sterilized pudding formulation to a temperature of from above 265° F. (129.4° C.) to below about 130° F. (54.4° C.). Utilizing the formulation parameters of this invention it has been found that significant viscosity does not develop in the formulation until the temperature has cooled to below the melting point of the fat component which is typically below 110° F. At this point it may be desirable, although not necessary, to continue the cooling process in one or more swept-surface heat exchangers. Normally cooling is continued down to a temperature of between 60° and 90° F. (15.5° and 32.2° C.) at which point the pudding formulation is aseptically packaged. It is however within the scope of this invention to employ only non-swept-surface heat exchangers to cool the pudding after sterilization.

The aseptic-packaging process includes the steps of sterilizing the containers and lids into which the sterilized pudding is packaged and then filling the container with pudding in an enclosed sterile environment. Such known methods as superheated steam, hydrogen peroxide, ultraviolet light, etc. are useful for sterilizing the packaging materials which, in the case of pudding, are typically comprised of single service, cup-shaped plastic containers and flexible lid stock. The lid stock, may be foil-laminated polyester with a heat-sealable coating which will be heat sealed onto the container. The plastic container may be a thermoformed or molded container fabricated from a material such as high-impact polystyrene.

This invention is further described but not limited by the following example.

EXAMPLE

A vanilla-flavored pudding was prepared having the following formulation:

| Ingredient | Weight % |
| --- | --- |
| Skim Milk | 73.20 |
| Sucrose | 17.43 |
| Hydrogenated Coconut and Palm Kernel Oils (M.P. about 102° F.) | 5.62 |
| Modified Waxy Maize Starch | 2.80 |
| Vanilla Extract | 0.40 |
| Salt | 0.20 |
| Emplex | 0.20 |
| Flavor/Color | 0.15 |

The pudding was prepared by adding skim milk to a batch tank and heating to 135° F. (57.2° C.). The remaining ingredients (except liquid flavors) were then added and the temperature of the mix was again brought to 135° F. (57.2° C.). Liquid flavors were added and the mix was homogenized at 2000 psig in a first stage and 500 psig in a second stage. The temperature was maintained at about 135° F. to 145° F. (57.2° to 62.8° C.) during homogenization. The mixture was then cooled to about 70° F. (21° C.) in a fixed plate heat exchanger and held in a tank prior to being pumped in a continuous manner through a series of plate heat exchangers wherein the temperature is raised to 185° F. (85° C.) and then through a series of scraped-surface heat exchanger where the temperature is elevated to 285° F. (140.6° C.). The formulation is maintained at 285° F. (140.6° C.) for about 15 seconds and then immediately passed through a series of fixed plate heat exchangers where the temperature is lowered to about 110° F. (43° C.). The pudding formulation is then cooled to 75° F. (23.9° C.) in a series of four scraped-surface heat exchangers and then aseptically-packaged. The packages are then stored at refrigerator conditions where the pudding remains essentially free of synersis for a period in excess of 60 days and develops an excellent texture.

The pudding of this example is found to have an on-line viscosity after sterilization of less than about one-third that of a conventional pudding formulation which contain fats which are essentially-free of lauric acid (e.g., cottonseed oil, soybean oil, and the like), and a starch level of about 4.5% or more. After one day of refrigerated storage the pudding of this example attains a viscosity which is about equal to that of day-old conventional puddings. During storage the pudding of the example gains viscosity at a relatively fast rate and attains a desirably high viscosity which, basis a series of taste evaluations, has been determined to be a Brookfield viscosity value of between 40 and 65, within the first 15 days of refrigerated storage. This desirable viscosity is maintained during extended refrigerated storage. The viscosity value is obtained using a product temperature of 40° F. (4.4° C.) and a Model HAT Brookfield Viscometer (Brookfield Engineering Laboratories, Inc., Staughton, Mass.) with a TB spindle (36 mm) and a rate of 5 RPM's.

In contrast, conventional puddings do not achieve a desirably high viscosity until after several weeks of refrigerated storage, unless high starch levels are employed. As noted previously high starch levels lead to undesirably-high, on-line viscosities and gummy or pasty textures in the stored product.

Having thus described the invention what is claimed is:

1. A process for preparing an aseptically-packaged, ready-to-eat, starch-containing pudding comprising the steps of:
   (a) preparing a pudding formulation comprised of milk solids, water, 3.5 to 10% of fat having a lauric acid content of at least 20%, sweetener, flavor and color agents, 2.5 to 4.2% of an essentially amylose-free, chemically-modified starch and from about 0.12 to 0.2% of an anionic surfactant selected from the group consisting of calcium- or sodium-stearyol 2-lactylate and sodium lauryl sulfate, wherein said formulation is essentially-free of hydrocolloid thickeners;
   (b) mixing and heating the said formulation at a temperature of from 125° to 160° F. in order to thoroughly melt and disperse the fat and the surfactant;
   (c) homogenizing the mix of step (b) while maintaining the temperature of the mix at from 125° to 160° F.;
   (d) subjecting the homogenized mixture to a high-temperature, short-time heating step at about 265° to 305° F. in order to both cook the starch and sterilize the mix;
   (e) initially cooling the cooked and sterilized pudding mix in one or more fixed plate or tube heat exchangers to a temperature of below about 130° F.; thereafter,
   (f) further cooling the pudding mix to a temperature of from 60° to 90° F., said further cooling being effected in a fixed plate, tube or swept-surface heat exchanger; and then
   (g) aseptically-packaging the pudding mix.

2. The process of claim 1 wherein the lauric acid content of the fat is in excess of 40%.

3. The process of claim 2 wherein the starch content is from 2.5 to 3.3%.

4. The process of claim 1 wherein the cooling of step (f) is also conducted in fixed plate or tube heat exchangers.

5. The process of claim 1 wherein the starch is a waxy maize starch.

6. The process of claim 4 wherein the homogenization is effected in two stages with the first stage being at a pressure of at least 1000 psig and the second stage being at a pressure of at least 400 psig.

7. The process of claim 1 wherein the fat component has a melting point in excess of 90° F.

8. The process of claim 1 wherein the fat is coconut and/or palm kernel oil.

9. The process of claim 3 wherein the pudding formulation consists essentially of said milk solids, water, fat, sweetener, flavor and color agents, starch and surfactant.

* * * * *